(12) United States Patent
Levin et al.

(10) Patent No.: US 6,758,611 B1
(45) Date of Patent: Jul. 6, 2004

(54) RADIALLY SYMMETRICAL OPTOELECTRIC MODULE

(76) Inventors: Bradley S. Levin, 628 Forest Ave., Apt. C., Palo Alto, CA (US) 94301; Oliver W. Northrup, 1336 Gilmore St., Mountain View, CA (US) 94040; Joseph John Vandenberg, 415 N. Lark Ellen Ave., West Covina, CA (US) 91791

( * ) Notice: Subject to any disclaimer, the term of this patent is extended or adjusted under 35 U.S.C. 154(b) by 0 days.

(21) Appl. No.: 10/044,654

(22) Filed: Jan. 11, 2002

Related U.S. Application Data

(60) Provisional application No. 60/274,999, filed on Mar. 12, 2001.

(51) Int. Cl.[7] .................................................. G02B 6/36
(52) U.S. Cl. .......................... 385/93; 385/31; 385/49; 385/88; 385/89; 385/90; 385/91; 385/92
(58) Field of Search ...................... 385/31, 49, 88–93

(56) References Cited

U.S. PATENT DOCUMENTS

| | | | | |
|---|---|---|---|---|
| 4,639,077 A | * | 1/1987 | Dobler | 385/92 |
| 5,107,537 A | * | 4/1992 | Schriks et al. | 385/91 |
| 5,257,336 A | * | 10/1993 | Dautartas | 385/93 |
| 5,537,504 A | * | 7/1996 | Cina et al. | 385/93 |
| 5,692,083 A | * | 11/1997 | Bennett | 385/88 |
| 5,815,623 A | * | 9/1998 | Gilliland et al. | 385/93 |
| 5,940,564 A | * | 8/1999 | Jewell | 385/93 |
| 6,061,493 A | * | 5/2000 | Gilliland et al. | 385/140 |
| 6,071,017 A | * | 6/2000 | Gilliland et al. | 385/93 |
| 6,157,012 A | * | 12/2000 | Tanaka et al. | 219/633 |
| 6,409,398 B2 | * | 6/2002 | Nakaya et al. | 385/93 |
| 6,517,258 B1 | * | 2/2003 | Keska et al. | 385/92 |
| 6,547,455 B1 | * | 4/2003 | Hashizume | 385/93 |
| 2002/0114593 A1 | * | 8/2002 | Terada et al. | 385/93 |

* cited by examiner

Primary Examiner—Brian Healy
Assistant Examiner—Daniel Petkovsek
(74) Attorney, Agent, or Firm—Parsons & Goltry; Robert A. Parsons; Michael W. Goltry

(57) ABSTRACT

A radially symmetrical optoelectric module includes a receptacle assembly with a symmetrical tubular ferrule and a first lens. The ferrule defines an axial opening extending along an optical axis. The ferrule is formed radially symmetrical about the optical axis with the first lens engaged in the ferrule along the optical axis. One end of the ferrule is formed to receive an end of an optical fiber such that the end is positioned along the optical axis and adjacent the first lens. An optoelectric package includes an optoelectric device and a second lens. The second lens is positioned adjacent the optoelectric device and positioned along the optical axis so that light traveling along the optical axis appears at the optoelectric device and passes through the second lens.

13 Claims, 1 Drawing Sheet

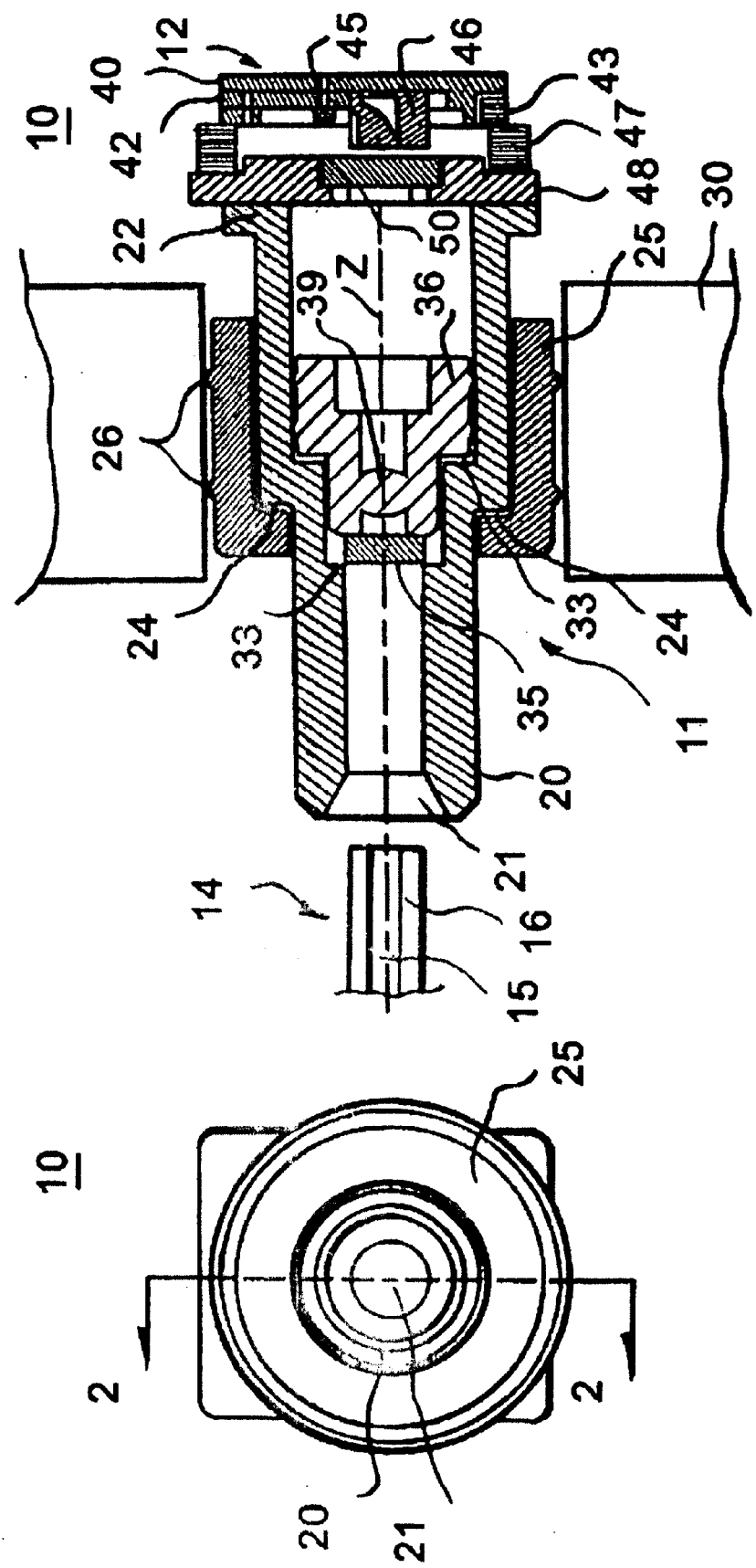

RADIALLY SYMMETRICAL OPTOELECTRIC MODULE

CROSS REFERENCE TO RELATED APPLICATION

This application claims the benefit of U.S. Provisional Application No. 60/274,999, filed 12 Mar. 2001.

FIELD OF THE INVENTION

This invention relates to optical-to-electrical and electrical-to-optical modules.

More particularly, the present invention relates to optical-to-electrical and electrical-to-optical modules that are radially symmetrical about a longitudinal axis.

And more specifically the present invention pertains to optical-to-electrical and electrical-to-optical modules that incorporate a lens system, along with the radially symmetrical features that compensate for temperature changes.

BACKGROUND OF THE INVENTION

In optical-to-electrical and electrical-to-optical (hereinafter "optoelectric") modules used in the various communications fields, one of the problems that must be solved is the efficient transmission of light between a light generating device and an optical fiber or, alternatively, the transmission of light from the optical fiber to a light receiving device without being affected by temperature changes and the like. Here, it will be understood by those skilled in the art that the term "light" is a generic term that includes any electromagnetic radiation that can be modulated and transmitted by optical fibers or other optical transmission lines.

Here it will be understood that the optoelectric modules are used to communicate between an optical fiber and an optoelectric device, such as a light source (e.g. a laser, light emitting diode, etc.) generally referred to as a transmission module, or between an optical fiber and a light receiving device (e.g. a photodiode, PIN diode, PN diode, etc.) generally referred to as a receiving module. In this disclosure both modules are referred to generically as optoelectric modules.

Generally, one of the problems with optoelectric modules is the amount of time and effort required in the fabrication and assembly. Another problem that arises is that much of the time and effort in assembly and mounting is applied in alignment of the various components so that light generated by, for example a laser, reaches the core of an optical fiber and light emanating from an optical fiber must be directed onto a photo diode or the like. After substantial time is expended in the original alignment procedures, temperature changes and the like during operation can substantially change the alignment and cause substantial changes in the amount of light being usefully applied. These changes can substantially affect the continued operation of the modules.

It would be highly advantageous, therefore, to remedy the foregoing and other deficiencies inherent in the prior art.

Accordingly, it is an object the present invention to provide new and improved radially symmetrical optoelectric modules.

Another object of the present invention is to provide new and improved radially symmetrical optoelectric modules that further incorporate a novel lens systems so that expansion and/or contraction during changes in temperature does not affect alignment.

Another object of the present invention is to provide new and improved radially symmetrical optoelectric modules that are easily aligned and assembled.

Another object of the present invention is to provide new and improved radially symmetrical optoelectric modules that remain aligned during changes in operating temperature.

And another object of the present invention is to provide new and improved radially symmetrical optoelectric modules that improve the efficiency of optical systems.

Still another object of the present invention is to provide new and improved radially symmetrical optoelectric modules that allow the use of a variety of components and component materials.

SUMMARY OF THE INVENTION

Briefly, to achieve the desired objects of the present invention in accordance with a preferred embodiment thereof, provided is a radially symmetrical optoelectric module including a symmetrical ferrule defining an axial opening extending along an optical axis and having first and second ends positioned along the optical axis. The ferrule is formed radially symmetrical about the optical axis with a lens assembly engaged in the ferrule along the optical axis. A first end of the ferrule is formed to receive an optical fiber such that an end of the optical fiber is positioned along the optical axis and adjacent the lens assembly and light passing through the optical fiber is acted upon by the lens assembly and an optoelectric device is affixed to the second end of the ferrule so that light traveling along the optical axis appears at the optoelectric device.

In a preferred embodiment, the radially symmetrical optoelectric module includes a receptacle assembly with a symmetrical ferrule and a first lens. The ferrule defines an axial opening extending along an optical axis and has first and second ends positioned along the optical axis. The ferrule is formed radially symmetrical about the optical axis and the first lens is engaged in the ferrule along the optical axis. The first end of the ferrule is formed to receive an optical fiber such that an end of the optical fiber is positioned along the optical axis and adjacent the first lens with light passing through the optical fiber being acted upon by the first lens. An optoelectric package includes an optoelectric device and a second lens positioned adjacent the optoelectric device, the second lens is mounted along the optical axis by the optoelectric package. The optoelectric package is affixed to the second end of the ferrule so that light traveling along the optical axis appears at the optoelectric device and passes through the second lens. Because of the "two lens system" axial spacing of the structural components is not critical and because of the combination of radial symmetry and the two lenses, the module expands and contracts equally in all directions during changes in temperature so that alignment is not affected and the module provides a constant output under varying conditions.

BRIEF DESCRIPTION OF THE DRAWINGS

The foregoing and further and more specific objects and advantages of the invention will become readily apparent to those skilled in the art from the following detailed description of a preferred embodiment thereof, taken in conjunction with the drawings in which:

FIG. 1 is an end view of an optoelectric module in accordance with the present invention; and FIG. 2 is a sectional view of the optoelectric module as seen from the line 2—2 of FIG. 1.

DETAILED DESCRIPTION OF THE DRAWINGS

Referring to FIGS. 1 and 2, an end view and sectional view, respectively, are illustrated of either an optical-to-electrical or electrical-to-optical (hereinafter referred to as optical/electrical) module 10 in accordance with the present invention. It will be understood by those skilled in the art that modules of the type discussed herein are generally include as pairs of channels, one of which receives electrical signals, converts the electrical signals to optical (light) beams by way of a laser or the like and introduces them into one end of an optical fiber, which then transmits the modulated optical beams to external apparatus. The second channel or module receives modulated optical beams from an optical fiber connected to the external apparatus, conveys the modulated optical beams to a photo diode or the like, which converts them to electrical signals. In the following description, the apparatus and methods can be used in either of the channels but, since the optical portions of the two channels are substantially similar, only one channel will be discussed with the understanding that the description applies equally to both channels.

Module 10 of FIGS. 1 and 2 includes a receptacle assembly 11 and an optoelectric package 12 aligned and affixed together, as will be disclosed in more detail below. Receptacle assembly 11 is designed to receive an optical fiber 14 in communication therewith, in a manner that will become clear presently. In the preferred embodiment, optical fiber 14 is a single mode fiber (the use of which is one of the major advantages of the present invention) including a glass core 15 and a cladding layer 16. Receptacle assembly 11 includes an elongated cylindrical ferrule 20 defining a fiber receiving opening 21 at one end and a mounting flange 22 at the opposite end.

Ferrule 20 has a radially outward directed step 24 formed in the outer periphery to operate as a stop for a resilient sleeve 25. Sleeve 25 has an inwardly directed flange formed adjacent one end so as to engage step 24 and prevent relative longitudinal movement between ferrule 20 and sleeve 25. Sleeve 25 also includes radially outwardly directed ribs or protrusions 26 in the outer periphery that are designed to frictionally engage the inner periphery of a mounting housing 30. Thus, to easily and conveniently mount module 10 in housing 30, ferrule 20 with sleeve 25 engaged thereover is press-fit into the circular opening in housing 30 and frictionally holds module 10 in place. Preferably, sleeve 25 is formed, completely or partially, of some convenient resilient material and may be electrically conductive or non-conductive as required in the specific application.

Progressing from opening 21 toward flange 22, ferrule 20 has two radially outwardly directed steps 32 and 33. Step 32 provides a surface or stop for the mounting of an optical spacer 35 and step 33 provides a surface or a stop for the positioning of an optical lens assembly 36. In this preferred embodiment, lens assembly 36 is formed of plastic and may be, for example, molded to simplify manufacturing of module 10. It should be understood that the term "plastic" is used herein as a generic term to describe any non-glass optical material that operates to transmit optical beams of interest therethrough and which can be conveniently formed into lenses and the like. For example, in most optical modules used at the present time the optical beams are generated by a laser that operates in the infra-red band and any materials that transmit this light, including some oxides and nitrides, come within this definition.

Lens assembly 36 defines a central opening for the transmission of light therethrough from one end to the opposite end along an optical axis Z. A lens 39 is integrally formed in the central opening a fixed distance from optical spacer 35. Lens assembly 36 is formed with radially outwardly projecting ribs or protrusions in the outer periphery so that it can be press-fit into ferrule 20 tightly against spacer 35. Thus, lens assembly 36 is frictionally held in place within ferrule 20 and holds spacer 35 fixedly in place. Also, lens 39 is spaced, a fixed and known distance from spacer 35. In this preferred embodiment, optical fiber 14 in inserted into ferrule 20 so that glass core 15 buts against spacer 35, which substantially reduces or suppresses return reflections. Further, by forming spacer 35 of glass material with an index of refraction similar to the index of refraction of glass core 15, spreading of the light beam is substantially reduced and lower optical power is required to collimate the beam.

Optoelectric package 12 includes a base or support plate 40 and a mounting plate 42 positioned thereon. One or more spacer rings 43 may be positioned on plate 42 to provide sufficient distance for components mounted thereon. In this example a laser 45 is mounted on the upper surface of mounting plate 42 and positioned to transmit light generated therein to a lens block 46. Alternatively, laser 45 could be a photodiode or the like. Lens block 46 is mounted on mounting plate 42 by some convenient means, such as outwardly extending ears (not shown). A ring 47 is positioned on spacer rings 43 and a cap or cover 48 is affixed to ring 47. Generally, the entire assembly, including plate 40, mounting plate 42, spacer rings 43, ring 47 and cover 48 are fixedly attached together by some convenient means, such as welding, gluing, etc. so that laser 45 is enclosed in a hermetically sealed chamber. However, a hermetic seal is not necessary in many embodiments in which the laser or photodiode used is either separately sealed or is not sensitive to atmospheric conditions. Connections to the electrical components can be, for example, by coupling through plate 40.

A window 50 is sealed in cover 48 so as to be aligned with lens block 46. Lens block 46 redirects light from laser 45 at a ninety degree angle out through window 50 along optical axis Z and may include one or more lenses or optical surfaces. Further, as illustrated in FIG. 2, window 50 is affixed to the underside of cover 48 by some convenient means, such as epoxy or other adhesive, so as to hermetically seal the light transmitting opening through cover 48. If a hermetic seal is not required, window 50 and any lenses incorporated therein can be for med (e.g. molded) from plastic. In many applications, lens block 46 may be molded from plastic for convenience in manufacturing.

Optoelectric package 12 is affixed to receptacle assembly 11 with flange 22 of ferrule 20 butting against the upper surface of cover 48. Further, optoelectric package 12 is optically aligned with receptacle assembly 11 so that light from laser 45 is directed along optical axis Z into core 15 of optical fiber 14. This alignment can be accomplished in different ways but one reliable method is known as active alignment. In this process, laser 45 is activated and receptacle assembly 11 is positioned approximately over optoelectric package 12. The light in optical fiber 14 is measured and the alignment is adjusted for maximum light. When maximum light is measured alignment has been achieved and receptacle assembly 11 is fixed to optoelectric package 12 by some convenient means, such as welding or adhesive.

Here it should be specifically noted that ferrule 20 is formed so as to be symmetrical about optical axis Z, referred to herein as "radially symmetrical". FIGS. 1 and 2 illustrate the fact that module 10 is radially symmetric. Also, in this preferred embodiment a "two lens system" is used to communicate light between an optical fiber (14) and an optoelectric device (e.g. laser 45). One of the lenses of the lens system is mounted in the receptacle assembly 11 and the other lens is mounted in the optoelectric package 12. It should be noted that the term "two lens system" refers to at least a first lens mounted a fixed distance from an optical fiber and at least a second lens mounted a fixed distance from an optoelectric device (e.g. laser 45). The "two lens system" substantially improves the tolerance of the distance between the two lenses along optical axis Z. For additional information on the "two lens system" refer to copending U.S. patent application entitled "Optoelectric Alignment Apparatus", filed in 12 Sep. 2001, with Ser. No. 09/954,919, and incorporated herein by reference.

The combination of the radially symmetrical construction and the "two lens system" substantially reduces the effects of temperature changes by expanding and contracting equally in all directions. Thus, during temperature changes optical axis Z and all components aligned along optical axis Z remain aligned. Further, the radially symmetric feature provides several advantages in construction and assembly, at least one advantage being that assembly into housing 30 does not require any kind of alignment.

In a preferred embodiment, ferrule 20 is formed of an electrically conductive material, such as any of the easily workable metals. Also, sleeve 25 is formed of any of the well known resilient plastic/metal combinations so that it is electrically conductive. Cover 48 of optoelectric package 12 is also formed of metal and receptacle assembly 11 is affixed to optoelectric package 12 by a convenient welding process. Further, because module 10 is symmetric about optical axis Z, ferrule 20 can be easily frictionally engaged in housing 30 using resilient sleeve 25. In this fashion the entire module 10 can be assembled and mounted using well known machine assembly techniques.

Accordingly, a new and improved radially symmetrical module is disclosed which is easily assembled and mounted. Because a "two lens system" is used in conjunction with a radially symmetrical mounting structure, the distance along the optical axis between the pair of lenses is not critical. Also, the new and improved radially symmetrical module expands and contracts equally in all directions during changes in temperature so that alignment is not affected and the module provides a constant output under varying conditions and, thereby, improves the efficiency of the optical system. Also, manufacturing tolerances can be substantially reduced, greatly reducing manufacturing time, labor, and costs. Further, the new and improved features allow the use of a variety of components and component materials (e.g. plastic lenses and other optical components).

Various changes and modifications to the embodiments herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

What is claimed is:

1. A radially symmetrical optoelectric module comprising:
   a symmetrical ferrule defining an axial opening extending along an optical axis and having first and second ends positioned along the optical axis, the ferrule being formed radially symmetrical about the optical axis;
   a sleeve formed of resilient material engaged over an outer periphery of the ferrule for mounting the ferrule in a housing, the sleeve being frictionally engaged over the outer periphery of the ferrule, and the sleeve and the ferrule each include projections for limiting relative axial movement therebetween;
   an elongated radially symmetric lens assembly with a central opening, the lens assembly being engaged in an inner periphery of the ferrule and along the optical axis;
   the first end of the ferrule being formed to receive an optical fiber such that an end of the optical fiber is positioned along the optical axis and adjacent the elongated radially symmetric lens assembly and light passing through the optical fiber is acted upon by the elongated radially symmetric lens assembly; and
   an optoelectric device affixed to the second end of the ferrule so that light traveling along the optical axis appears at the optoelectric device.

2. A radially symmetrical optoelectric module as claimed in claim 1 wherein the ferrule is formed of electrically conductive material.

3. A radially symmetrical optoelectric module as claimed in claim 2 wherein the sleeve is an electrically conductive sleeve engaged over an outer periphery of the ferrule for mounting the ferrule in a housing.

4. A radially symmetrical optoelectric module as claimed in claim 1 wherein the ferrule and lens assembly form a first structural component and the optoelectric device is mounted in a second structural component.

5. A radially symmetrical optoelectric module as claimed in claim 4 wherein the first structural component includes a first lens of a two lens system and the second structural component includes a second lens of the two lens system, the first and second structural components mounting the two lens system along the optical axis.

6. A radially symmetrical optoelectric module comprising:
   a receptacle assembly including a symmetrical ferrule and an elongated radially symmetric lens assembly, the ferrule defining an axial opening extending along an optical axis and having first and second ends positioned along the optical axis, the ferrule being formed radially symmetrical about the optical axis, the elongated radially symmetric lens assembly being engaged in the ferrule along the optical axis, and the first end of the ferrule being formed to receive an optical fiber such that an end of the optical fiber is positioned along the optical axis and adjacent the first lens with light passing through the optical fiber being acted upon by the elongated radially symmetric lens assembly;
   a sleeve formed of resilient material engaged over an outer periphery of the ferrule for mounting the ferrule in a housing, the sleeve being frictionally engaged over the outer periphery of the ferrule, and the sleeve and the ferrule each including projections for limiting relative axial movement therebetween;
   the elongated radially symmetric lens assembly including a central opening with a first lens integrally formed in the central opening and radially outwardly projecting ribs in an outer periphery of the elongated radially symmetric lens assembly; and
   an optoelectric package including an optoelectric device and a second lens positioned adjacent the optoelectric device, the second lens being mounted along the optical axis by the optoelectric package, and the optoelectric package being affixed to the second end of the ferrule so that light traveling along the optical axis appears at the optoelectric device and passes through the second lens.

7. A radially symmetrical optoelectric module as claimed in claim 6 wherein the ferrule is formed of electrically conductive material.

8. A radially symmetrical optoelectric module as claimed in claim 7 wherein the sleeve is an electrically conductive sleeve engaged over an outer periphery of the ferrule for mounting the ferrule in a housing.

9. A radially symmetrical optoelectric module as claimed in claim 6 wherein the receptacle assembly forms a first structural component and the optoelectric package forms a second structural component.

10. A radially symmetrical optoelectric module comprising:
 a tubularly shaped ferrule with an axially extending central opening defining an optical axis, the ferrule being radially symmetric about the optical axis, and a first end of the ferrule constructed to receive an end of an optical fiber engaged therein;
 a sleeve formed of resilient material engaged over an outer periphery of the ferrule for mounting the ferrule in a housing, the sleeve being frictionally engaged over the outer periphery of the ferrule, and the sleeve and the ferrule each include projections for limiting relative axial movement therebetween;
 an elongated radially symmetric lens assembly including a central opening with a first lens integrally formed in the central opening and radially outwardly projecting ribs extending from an outer periphery of the elongated radially symmetric lens assembly, the elongated radially symmetric lens assembly being mounted in the ferrule along the optical axis and positioned to be adjacent the end of the optical fiber; and
 an optoelectric package including a second lens and an aligned optoelectric device, the optoelectric package being affixed to a second end of the ferrule opposite the first end with the second lens positioned along the optical axis.

11. A radially symmetrical optoelectric module as claimed in claim 10 wherein the ferrule is formed of electrically conductive material.

12. A radially symmetrical optoelectric module as claimed in claim 11 wherein the sleeve is an electrically conductive sleeve engage over an outer periphery of the ferrule for mounting the ferrule housing.

13. A radially symmetrical optoelectric module as claimed in claim 10 wherein the receptacle assembly forms a first structural component and the optoelectric package forms a second structural component.

* * * * *

UNITED STATES PATENT AND TRADEMARK OFFICE
CERTIFICATE OF CORRECTION

PATENT NO. : 6,758,611 B1
DATED : July 6, 2004
INVENTOR(S) : Levin et al.

It is certified that error appears in the above-identified patent and that said Letters Patent is hereby corrected as shown below:

Column 8,
Line 20, replace "engage over an out periphery of the ferrule for mounting the ferrule housing" with -- engaged over an outer periphery of the ferrule for mounting in a ferrule housing --.

Signed and Sealed this

Eleventh Day of January, 2005

JON W. DUDAS
*Director of the United States Patent and Trademark Office*